(12) United States Patent
Yamada et al.

(10) Patent No.: US 11,318,638 B2
(45) Date of Patent: May 3, 2022

(54) FORMING-MATERIAL CONNECTING DEVICE AND FORMING APPARATUS

(71) Applicant: FUJIFILM BUSINESS INNOVATION CORP., Tokyo (JP)

(72) Inventors: Taichi Yamada, Kanagawa (JP); Wataru Suzuki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 99 days.

(21) Appl. No.: 17/011,704

(22) Filed: Sep. 3, 2020

(65) Prior Publication Data
US 2021/0299913 A1 Sep. 30, 2021

(30) Foreign Application Priority Data

Mar. 25, 2020 (JP) .............................. JP2020-055094

(51) Int. Cl.
*B29B 11/00* (2006.01)
*B29B 13/00* (2006.01)
*B29B 15/00* (2006.01)
*B29B 15/08* (2006.01)
*B29B 11/16* (2006.01)
*B29B 11/12* (2006.01)
(Continued)

(52) U.S. Cl.
CPC .............. *B29B 15/08* (2013.01); *B29B 11/12* (2013.01); *B29B 11/16* (2013.01); *B29B 13/02* (2013.01); *B29C 70/20* (2013.01); *B29K 2077/00* (2013.01); *B29K 2307/04* (2013.01)

(58) Field of Classification Search
CPC ......... B29B 11/00; B29B 11/10; B29B 11/12; B29B 11/16; B29B 13/00; B29B 13/02; B29B 15/00; B29B 15/08; B29C 70/00; B29C 70/20
See application file for complete search history.

(56) References Cited

U.S. PATENT DOCUMENTS

| 5,936,861 A * | 8/1999 | Jang ...................... B33Y 70/00 700/98 |
| 2014/0061974 A1* | 3/2014 | Tyler ..................... B33Y 10/00 264/401 |
| 2017/0210074 A1* | 7/2017 | Ueda ..................... B33Y 10/00 |

FOREIGN PATENT DOCUMENTS

| JP | 2017-71101 A | 4/2017 |
| JP | WO2015/182675 A1 | 4/2017 |
| JP | 2019-81292 A | 5/2019 |

* cited by examiner

*Primary Examiner* — Jacob T Minskey
*Assistant Examiner* — Matthew Hoover
(74) *Attorney, Agent, or Firm* — Oliff PLC

(57) ABSTRACT

A forming-material connecting device includes a cutter that cuts a forming material constituted by plural continuous fiber bundles being impregnated with a resin material and supplied in a supply direction corresponding to an extending direction of the plural continuous fiber bundles. The cutter cuts at least a portion of the plural continuous fiber bundles. The forming-material connecting device also includes a joining portion joining portions of the forming material, which are cut by the cutter at a cutting point in the forming material, on a downstream and upstream side with respect to the cutting point in the supply direction by heating to join the resin materials of the portions of the forming material, or the joining portion joins a preceding forming material's trailing end portion and a leading end portion of a following forming material by heating to join resin materials of the preceding forming material and following forming material.

9 Claims, 5 Drawing Sheets

(51) Int. Cl.
*B29C 70/20* (2006.01)
*B29B 13/02* (2006.01)
B29K 307/04 (2006.01)
B29K 77/00 (2006.01)

FORMING-MATERIAL CONNECTING DEVICE AND FORMING APPARATUS

CROSS-REFERENCE TO RELATED APPLICATIONS

This application is based on and claims priority under 35 USC 119 from Japanese Patent Application No. 2020-055094 filed Mar. 25, 2020.

BACKGROUND

(i) Technical Field

The present disclosure relates to a forming-material connecting device and a forming apparatus.

(ii) Related Art

A three-dimensional object forming apparatus capable of suppressing fibers from meandering to suppress the rigidity of a three-dimensional component from decreasing has been known (for example, refer to Japanese Unexamined Patent Application Publication No. 2019-081292).

SUMMARY

Aspects of non-limiting embodiments of the present disclosure relate to a forming-material connecting device capable of supplying a forming material in a connected manner.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a forming-material connecting device including: a cutter that cuts a forming material constituted by a plurality of continuous fiber bundles being impregnated with a resin material and supplied in a supply direction corresponding to an extending direction of the plurality of continuous fiber bundles, the cutter cutting at least a portion of the plurality of continuous fiber bundles; and a joining portion that joins portions of the forming material, which are cut by the cutter at a cutting point in the forming material, on a downstream side and on an upstream side with respect to the cutting point in the supply direction by heating to join the resin materials of the portions of the forming material or joins a trailing end portion of a preceding forming material and a leading end portion of a following forming material by heating to join the resin materials of the preceding forming material and the following forming material.

BRIEF DESCRIPTION OF THE DRAWINGS

An exemplary embodiment of the present disclosure will be described in detail based on the following figures, wherein.

DETAILED DESCRIPTION

Figure 1:
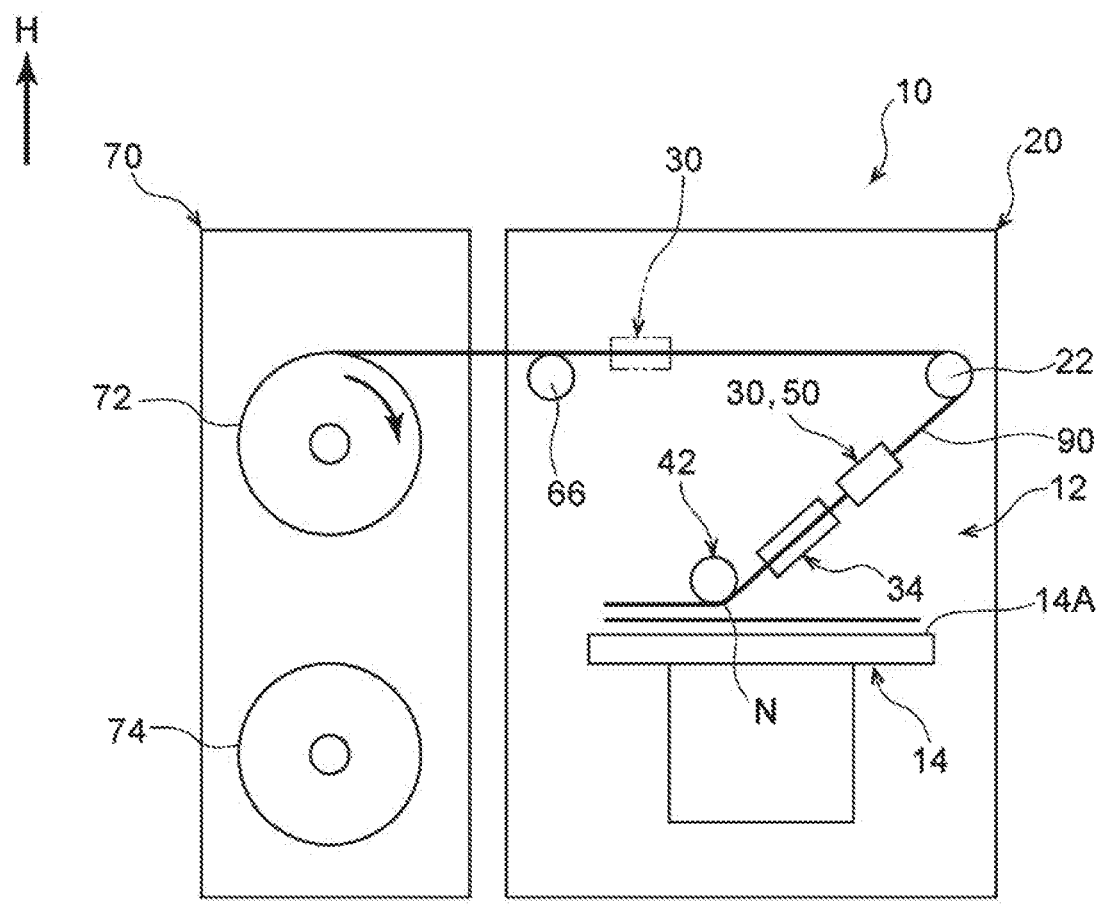
FIG. 1 is a schematic view of a forming apparatus according to the present exemplary embodiment.
Figure 2:
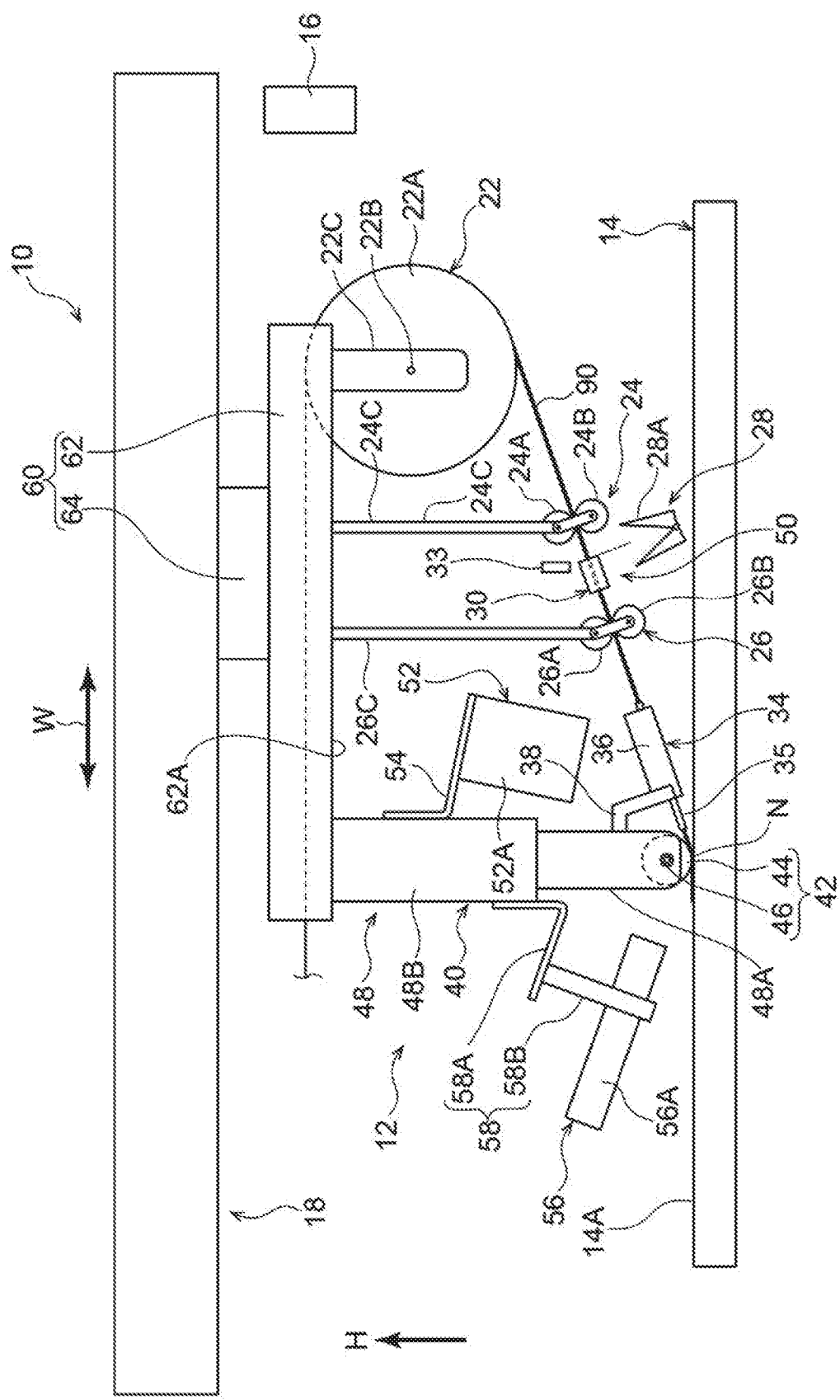
FIG. 2 is a schematic view of a forming unit of the forming apparatus according to the present exemplary embodiment.

Hereinafter, an exemplary embodiment according to the present disclosure will be described in detail with reference to the drawings. In FIGS. 1 and 2, arrow H denotes the upward direction (an upper side in the vertical direction) of a forming apparatus 10, and arrow W denotes the width direction (the horizontal direction) of the forming apparatus 10. A direction orthogonal to arrows H and W denotes the depth direction (the horizontal direction) of the forming apparatus 10.

Figure 5:
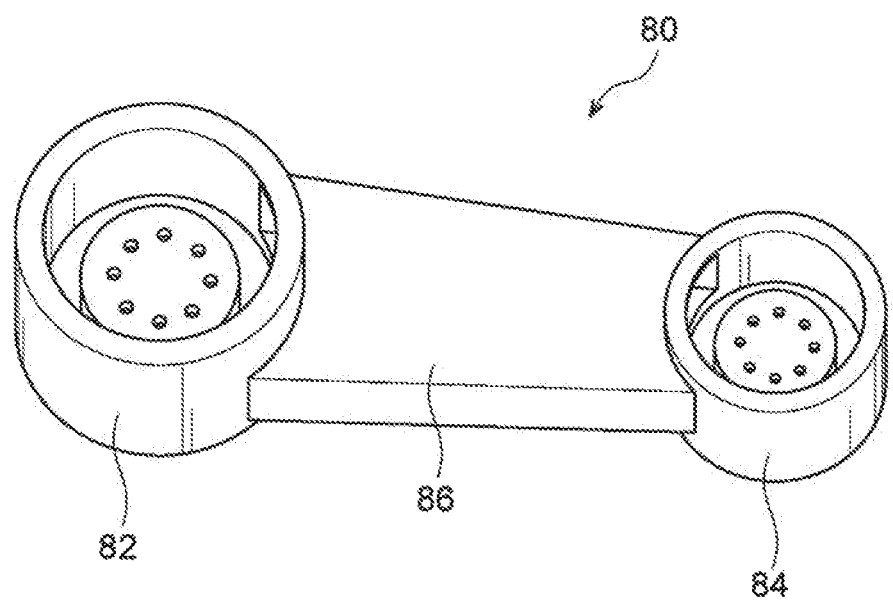
FIG. 5 is a perspective view of a formed object to be formed by the forming apparatus according to the present exemplary embodiment.

The forming apparatus 10 according to the present exemplary embodiment is a fused-deposition-modeling (FDM) type three-dimensional forming apparatus (3D printer) and forms an object such as a formed object 80 illustrated in FIG. 5 by calculating layer data of plural layers (forming data) from data such as three-dimensional data generated by three-dimensional computer aided design (CAD) and by layering layers in accordance with the layer data.

Figure 6:
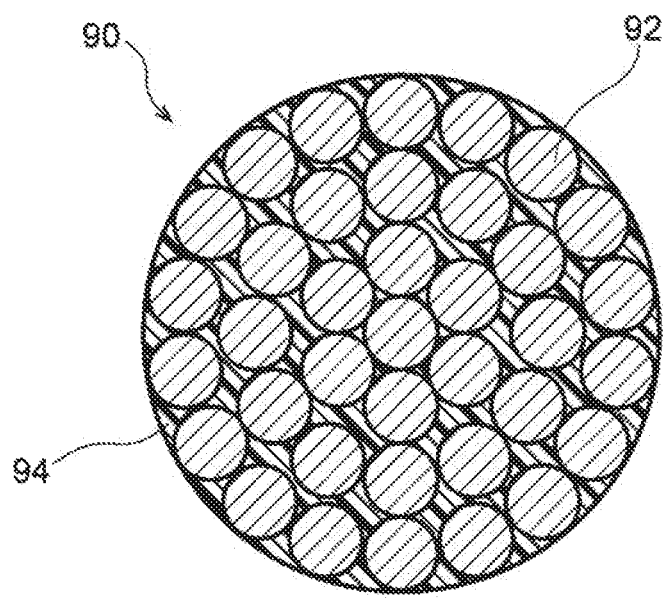
FIG. 6 is a sectional view of the forming material used for the forming-material connecting device and the forming apparatus according to the present exemplary embodiment.

As FIG. 6 illustrates, a forming material (filament) 90 used for the forming apparatus 10 according to the present exemplary embodiment includes continuous fiber bundles 92 (hereinafter, simply referred to as "fiber bundles") in which plural continuous fibers are bundled without being twisted together. The forming material 90 is formed in a manner such that gaps between continuous fibers of each of the fiber bundles 92 are impregnated with a resin material 94 constituted by, for example, a polyamide synthetic resin.

Examples of such a continuous fiber include a carbon fiber 0.005 mm in diameter TORAYCA (registered trade name) yarn T300, manufactured by Toray Industries, Inc. The forming material 90 is constituted by 1000 or more (for example, 3000) such continuous fibers being bundled. The smaller number of the continuous fibers are illustrated in FIG. 6. The section of the forming material 90 (the fiber bundles 92) according to the present exemplary embodiment is, for example, circular in shape and 0.4 mm in diameter.

The extending direction of the fiber bundles 92 corresponds to the supply direction of the forming material 90. Hereinafter, the upstream side in the supply direction of the forming material 90 is sometimes simply referred to as an "upstream side", and the downstream side in the supply direction is sometimes simply referred to as a "downstream side".

As FIG. 1 illustrates, the forming apparatus 10 has a forming chamber 20 and an accommodation chamber 70. As FIG. 2 illustrates, the forming apparatus 10 includes, in the forming chamber 20, a forming table 14 as an example of a placement table, a forming unit 12 disposed above the forming table 14, a movement unit 18 that moves the forming unit 12, and a controller 16 that controls each component.

Forming Chamber

Forming Table

As FIGS. 1 and 2 illustrate, the forming table 14 is disposed in a lower portion of the forming apparatus 10 (the forming chamber 20). The forming table 14 faces upward and has a forming surface 14A that is a horizontal plane.

Movement Unit

As FIG. 2 illustrates, the movement unit 18 is disposed in an upper portion of the forming apparatus 10 (the forming chamber 20) and constituted by combining known mechanisms. The movement unit 18 is capable of moving the forming unit 12 in the width direction, the depth direction, and the vertical direction and further capable of rotating the forming unit 12 about the axis in the vertical direction.

Forming Unit

The forming unit 12 is disposed between the forming table 14 and the movement unit 18 in the vertical direction. The forming unit 12 includes a pulley 22 over which a forming material 90 is looped, a delivering roller 24 as an example of a first supply portion that supplies the forming material 90, and a cutter 28 that cuts at least a portion of the forming material 90.

Figure 4:
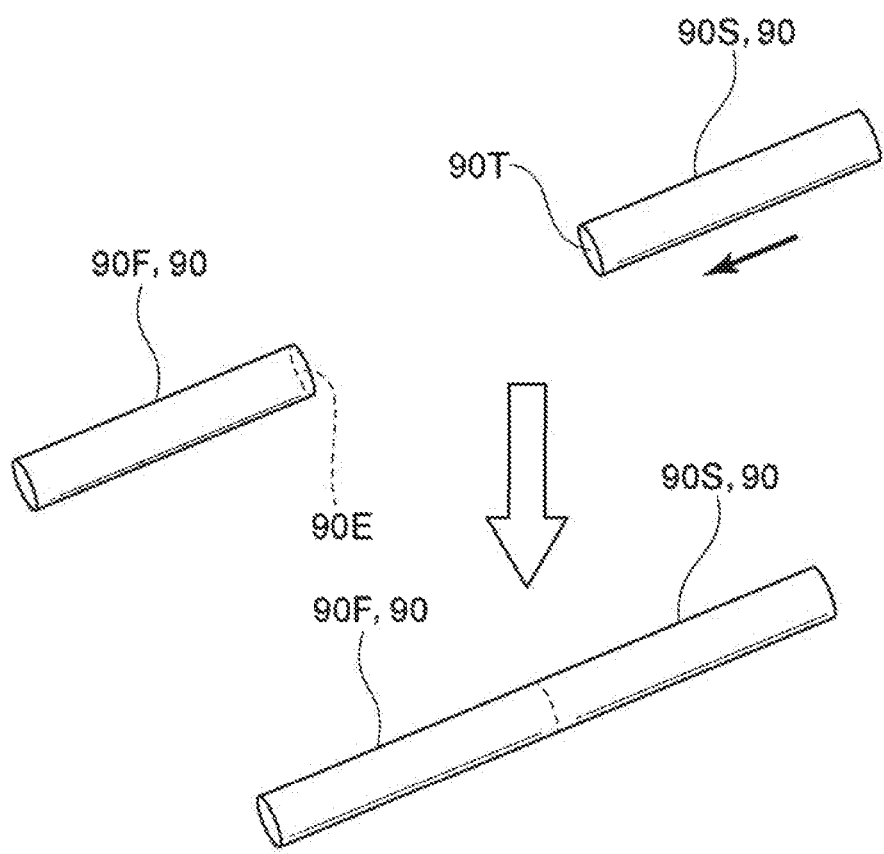
FIG. 4 is a perspective view of forming materials when the forming materials are connected to each other by the forming-material connecting device according to the present exemplary embodiment.

The forming unit 12 also includes a joining portion 30 that joins portions of the forming material 90, which have been cut by the cutter 28 at a cutting point in the forming material, on the downstream side and on the upstream side with respect to the cutting point by heating to join the resin materials 94 of the portions of the forming material 90 or, as FIG. 4 illustrates, joins a trailing end portion of a preceding forming material 90F and a leading end portion of a following forming material 90S by heating to join the resin materials 94 of the preceding forming material 90F and the following forming material 90S. The forming unit 12 also includes a delivering roller 26 that is disposed on the downstream side with respect to the joining portion 30 (the delivering roller 24) and is an example of a second supply portion that supplies the forming material 90.

The cutter 28 and the joining portion 30 constitute the forming-material connecting device 50. The cutter 28 and the joining portion 30 are disposed between the delivering roller 24 and the delivering roller 26 in the supply direction of the forming material 90.

The forming unit 12 further includes a first heating portion 34 that is an example of a heating portion that, while supporting, heats the forming material 90 supplied by the delivering roller 26 and supplies the forming material 90 to the forming surface 14A of the forming table 14, and the forming unit 12 also includes a pressing portion 40 that presses the forming material 90 that has been supplied to the forming surface 14A of the forming table 14.

The forming unit 12 further includes a second heating portion 52 that heats the forming material 90 at a position apart from the forming material 90, a third heating portion 56 that heats the pressing portion 40 at a position apart from the pressing portion 40, and a unit support portion 60 that supports the entire forming unit 12.

The forming unit 12 (the forming-material connecting device 50) further includes a supplementing portion 33 that adds another resin material (a resin material equivalent to the resin material 94), which is used for joining the resin materials 94, between the portions of the forming material 90, which have been cut by the cutter 28 at the cutting point in the forming material, on the downstream side and on the upstream side with respect to the cutting point or between the trailing end portion of the preceding forming material 90F and the leading end portion of the following forming material 90S. The supplementing portion 33 is not necessarily included.

Pulley

As FIG. 2 illustrates, in the forming unit 12, the pulley 22 is disposed in a portion of the forming apparatus 10 on one side thereof in the width direction (a portion on the right side in the figure), and the pulley 22 rotates around the axis in the depth direction.

The pulley 22 includes a cylindrical column-shaped pulley body 22A, a shaft portion 22B that constitutes the rotation axis of the pulley body 22A, and support brackets 22C that support the shaft portion 22B. The support brackets 22C are provided as a pair, and the paired support brackets 22C are disposed with the pulley body 22A interposed therebetween in the depth direction.

Specifically, the support brackets 22C extend vertically, and the shaft portion 22B is supported by the support brackets 22C at lower end portions thereof. In the configuration, four forming materials 90 are looped over the pulley 22 and arranged in a line in the depth direction.

Delivering Rollers

As FIG. 2 illustrates, the delivering roller 24 is disposed on the downstream side with respect to the pulley 22. The delivering roller 24 includes a driving roller 24A, a driven roller 24B, and support brackets 24C that support the driving roller 24A and the driven roller 24B.

The driving roller 24A and the driven roller 24B rotate around the axis in the depth direction. The driving roller 24A and the driven roller 24B hold vertically the four forming materials 90 that have been supplied via the pulley 22 therebetween so that the downstream side of the forming materials 90 to be supplied is lower than the upstream side of the forming materials 90.

The support brackets 24C are provided as a pair, and the paired support brackets 24C are disposed with the driving roller 24A and the driven roller 24B interposed therebetween in the depth direction. Specifically, the support brackets 24C extend vertically, and the driving roller 24A and the driven roller 24B are supported by the support brackets 24C at lower end portions thereof.

The delivering roller 26 is disposed on the downstream side with respect to the delivering roller 24 (the joining portion 30). The delivering roller 26 includes a driving roller 26A, a driven roller 26B, and support brackets 26C that support the driving roller 26A and the driven roller 26B.

The driving roller 26A and the driven roller 26B rotate around the axis in the depth direction. The driving roller 26A and the driven roller 26B hold vertically the four forming materials 90 that have been supplied by the delivering roller 24 therebetween so that the downstream side of the forming materials 90 to be supplied is lower than the upstream side of the forming materials 90.

The support brackets 26C are provided as a pair, and the paired support brackets 26C are disposed with the driving roller 26A and the driven roller 26B interposed therebetween in the depth direction. Specifically, the support brackets 26C extend vertically, and the driving roller 26A and the driven roller 26B are supported by the support brackets 26C at lower end portions thereof.

In the configuration, the driving roller 24A rotates in response to a driving force from a motor (not illustrated), and the delivering roller 24 thereby supplies the four forming materials 90 toward the forming surface 14A. The driving roller 26A rotates in response to a driving force from the motor (not illustrated) at the same rotation speed as that of the driving roller 24A, and the delivering roller 26 thereby supplies the four forming materials 90 toward the forming surface 14A.

In such a way, the four forming materials 90 that have been supplied via the pulley 22 are supplied to the forming surface 14A of the forming table 14 by the delivering roller 24 and the delivering roller 26 so that the downstream side of the forming materials 90 is lower than the upstream side thereof. In the present exemplary embodiment, the delivering rollers 24 and 26 rotate so that the forming materials 90 are supplied at a speed of, for example, 30 mm/sec or more to 100 mm/sec or less.

Cutter

The cutter 28 includes four cutting blades 28A that individually cut the respective four forming materials 90. In the present exemplary embodiment, "to cut at least a portion" means to cut each of the fiber bundles 92 except for a portion of the fiber bundles 92 (such a portion is approximately equivalent to the number of the fibers that are easily cut when the forming material 90 is pulled) and also to cut all of each of the fiber bundles 92.

Joining Portion

Figure 3:
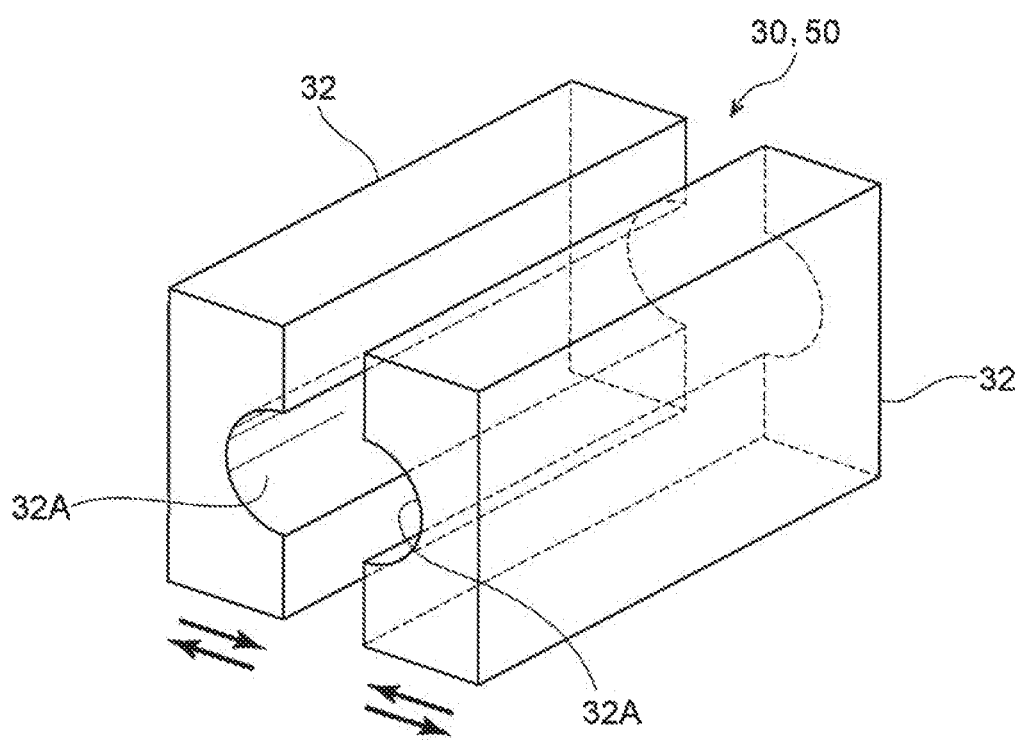
FIG. 3 is a perspective view of a forming-material connecting device according to the present exemplary embodiment.

As FIG. 3 illustrates, the joining portion 30 includes paired nip members 32 each having a rectangular flat plate shape of which the longitudinal direction corresponds to the supply direction. In a central portion in an inner surface of each of the paired nip members 32 that face each other, a recess 32A having a substantially semi-circular-shaped section is formed so as to extend in the longitudinal direction. The recesses 32A nip and press the forming material 90.

The paired nip members 32 are enabled to be moved by a known mechanism (not illustrated) in a direction in which the nip members 32 approach (come into contact with) each other and in a direction in which the nip members 32 separate from each other. Hereinafter, a state in which the inner surfaces of the paired nip members 32 approach (come into contact with) each other is referred to as a "closed state", and a state in which the inner surfaces of the paired nip members 32 separate from each other is referred to as an "open state".

When the paired nip members 32 are in the closed state, the inside diameter of a hole having a circular section and formed by the recesses 32A is slightly smaller than the outside diameter of the forming material 90. Thus, the paired nip members 32 nip and press the forming material 90.

A plate-shaped heater (not illustrated) is buried in each of the paired nip members 32 (the heater is incorporated in each of the paired nip members 32). The heaters heat the forming material 90, which has been nipped and pressed by the paired nip members 32, to, for example, 250° C. or more to 300° C. or less.

Thus, the portions of the forming material 90, which have been cut by the cutter 28 at the cutting point in the forming material, on the downstream side and the upstream side with respect to the cutting point are connected to each other by melting the resin materials 94 of the portions of the forming material 90 or, as FIG. 4 illustrates, a trailing end surface 90E in the trailing end portion of the preceding forming material 90F and a leading end surface 90T in the leading end portion of the following forming material 90S are connected to each other by melting the resin materials 94 of the forming materials 90F and 90S.

Although the temperature of the forming material 90 that has been heated decreases due to the paired nip members 32 being in the open state, to promote joining of the resin material 94 of the forming material 90, a cooling portion (not illustrated) that cools the forming material 90 may be provided on the downstream side with respect to the joining portion 30 and on the upstream side with respect to the delivering roller 26.

First Heating Portion

The first heating portion 34 is disposed on the downstream side with respect to the delivering roller 26. The first heating portion 34 includes a tube member 35 through which the forming material 90 passes, a body portion 36 that supports the tube member 35 in a surrounding manner, a plate-shaped heater (not illustrated), and support brackets 38.

The tube member 35 is made of a metallic material and, for example, four tube members 35 are provided. The four tube members 35 are arranged in a line in the depth direction. As viewed in the depth direction, each of the tube members 35 extends in an inclined manner in the supply direction of the forming material 90 so that an end portion on the downstream side of each of the tube members 35 is positioned lower than an end portion on the upstream side of each of the tube members 35.

The body portion 36 is made of a metallic material, has a rectangular parallelepiped shape, and, as viewed in the depth direction, has a rectangular shape extending in the supply direction of the forming material 90. A portion of each of the tube members 35 is surrounded by the body portion 36. In a portion of the body portion 36 on the downstream side in the supply direction of the forming material 90, an opening (not illustrated) is formed so that the four tube members 35 are exposed upward.

The heater is disposed in the body portion 36. Specifically, the heater is disposed in a portion of the body portion 36 on the upstream side in the supply direction of the forming material 90, and the heater heats the body portion 36 and the tube members 35 to, for example, 200° C. or more to 250° C. or less.

The support brackets 38 are provided as a pair, and the paired support brackets 38 are disposed with the body portion 36 interposed therebetween in the depth direction. Specifically, the support brackets 38 extend vertically while bending, and the body portion 36 is supported by the support brackets 38 at lower end portions thereof.

In the configuration, by using the heater, the first heating portion 34 heats the four forming materials 90 and softens a resin configurating the forming materials 90. The four forming materials 90 that have been softened then pass through the respective four tube members 35 provided in the first heating portion 34 and are supplied to the forming surface 14A of the forming table 14.

Thus, each of the forming materials 90 is caused to pass through the corresponding tube member 35, thereby being positioned at a supply position at which each of the forming materials 90 is to be supplied to the forming surface 14A (the forming table 14). That is, the first heating portion 34 functions as a positioning member that determines the supply position of each of the forming materials 90. In the present exemplary embodiment, in a part in which the forming materials 90 are discharged from the respective tube members 35, a pitch (center distance) between the adjacent forming materials 90 is, for example, 1 mm.

Pressing Portion

The pressing portion 40 is disposed on the downstream side with respect to the first heating portion 34. The pressing portion 40 includes a roller portion 42 and a support portion 48 that supports the roller portion 42. The roller portion 42 is disposed, with the axis direction thereof corresponding to the depth direction, so as to hold the four forming materials 90 that have been discharged from the first heating portion 34 in corporation with the forming surface 14A of the forming table 14.

The roller portion 42 has a shaft portion 46 extending in the depth direction and a body portion 44 having a circular section. In the depth direction, the length of the body portion 44 is greater than the length from the tube member 35 disposed on the frontmost side to the tube member 35 disposed on the backmost side.

The support portion 48 includes paired support plates 48A disposed with the roller portion 42 interposed therebetween in the depth direction, a body portion 48B to be coupled to upper ends of the paired support plates 48A, and an urging member (not illustrated) that urges the roller portion 42 toward the forming table 14.

The paired support plates 48A extend vertically with the thickness direction of the plates corresponding to the depth direction. The shaft portion 46 of the roller portion 42 is attached to lower end portions of the support plates 48A. A lower end portion of the body portion 48B is attached to upper end portions of the support plates 48A with the urging member interposed therebetween. One support bracket 38 provided on the first heating portion 34 is attached to one support plate 48A, and the other support bracket 38 provided on the first heating portion 34 is attached to the other support plate 48A.

The body portion 48B extends vertically, and the lower end portion of the body portion 48B is attached to upper end portions of the support plates 48A with the urging member interposed therebetween. In the configuration, the pressing portion 40 presses the forming material 90 against the forming surface 14A of the forming table 14 due to an urging force exerted by the urging member under a predetermined load. In the present exemplary embodiment, the pressing portion 40 presses the forming material 90 against the forming surface 14A under a pressure of, for example, 20 $N/cm^2$ or more to 50 $N/cm^2$ or less.

Second Heating Portion

The second heating portion 52 is disposed above the first heating portion 34. The second heating portion 52 includes a housing 52A, an infrared lamp (not illustrated) disposed in the housing 52A, and a support bracket 54.

The housing 52A has a bottomed cylindrical shape of which a side facing the first heating portion 34 is open. That is, the opening of the housing 52A faces the first heating portion 34 and the roller portion 42. In other words, the infrared lamp is disposed so as to radiate infrared radiation toward the first heating portion 34 and the roller portion 42 through the opening of the housing 52A.

The support bracket 54 is substantially "L"-shaped as viewed in the depth direction. A portion of the support bracket 54 on one side thereof is attached to an upper end portion of the housing 52A, and a portion of the support bracket 54 on the other side thereof is attached to a side surface of the body portion 48B of the support portion 48.

In the configuration, by using the infrared lamp, the second heating portion 52 heats a portion of each of the forming materials 90 that is passing from the opening of the body portion 36 in the first heating portion 34 through the corresponding tube member 35. By using the infrared lamp, the second heating portion 52 further heats a portion of each of the forming materials 90 that has been discharged from the first heating portion 34 and has not reached a nip part N constituted by the roller portion 42 and the forming surface 14A. Thus, the second heating portion 52 functions as a heating unit that heats a portion of each of the forming materials 90 that has been discharged from the first heating portion 34 and has not reached the nip part N.

Third Heating Portion

In the width direction of the forming apparatus 10, the third heating portion 56 is disposed on the opposite side to the first heating portion 34 with the pressing portion 40 interposed therebetween. The third heating portion 56 includes a housing 56A, a hot-air heater (not illustrated) disposed in the housing 56A, and a support bracket 58.

The housing 56A has a bottomed cylindrical shape of which a side facing the roller portion 42 of the pressing portion 40 is open. That is, the opening of the housing 56A faces the roller portion 42 of the pressing portion 40. In other words, the hot-air heater is disposed so as to jet hot air toward the roller portion 42 of the pressing portion 40 through the opening of the housing 56A.

The support bracket 58 includes a substantially "L"-shaped body portion 58A as viewed in the depth direction and a housing support portion 58B to which the housing 56A is attached. The housing support portion 58B extends substantially vertically, and the housing 56A is attached to a lower end portion of the housing support portion 58B. A portion of the body portion 58A on one side thereof is attached to an upper end portion of the housing support portion 58B, and a portion of the body portion 58A on the other side thereof is attached to a side surface of the body portion 48B of the support portion 48.

In the configuration, by using the hot-air heater, the third heating portion 56 heats the roller portion 42 of the pressing portion 40. That is, the roller portion 42 is heated by the second heating portion 52 from one side in the width direction of the forming apparatus 10 and heated by the third heating portion 56 from the other side in the width direction of the forming apparatus 10. Thus, the third heating portion 56 functions as a heating unit that heats the roller portion 42 of the pressing portion 40.

Unit Support Portion

The unit support portion 60 is disposed below the movement unit 18 and includes a body portion 62 to which the respective constituents are attached, and a middle portion 64 of which a lower end portion is attached to the body portion 62 and of which an upper portion is attached to the movement unit 18.

The body portion 62 has a plate shape in which the thickness direction of the plate corresponds to the vertical direction. An upper end of the body portion 48B of the pressing portion 40, upper ends of the support brackets 24C of the delivering roller 24, upper ends of the support brackets 26C of the delivering roller 26, and upper ends of the support brackets 22C of the pulley 22 are attached to a lower surface 62A of the body portion 62.

In the configuration, the unit support portion 60 (the forming unit 12) is moved in the width direction, the depth direction, and the vertical direction by the movement unit 18 that is controlled by the controller 16. Thus, the first heating portion 34 relatively approaches and separates from the forming surface 14A (the forming table 14), and the forming material 90 that has been supplied through the corresponding tube member 35 of the first heating portion 34 is enabled to be supplied to a corresponding portion of the nip part N.

Controller

The controller 16 controls the movement unit 18, the delivering rollers 24 and 26, the heater of the first heating portion 34, the infrared lamp of the second heating portion 52, the hot-air heater of the third heating portion 56, the cutter 28, the joining portion 30, and the like in accordance with the layer data (the forming data) based on the three-dimensional data of the formed object 80 that has been input.

The controller 16 controls specifically the stop/start of supply from the delivering roller 24 and the delivering roller 26 and a cutting operation of the cutter 28 so that the forming material 90 is cut at a timing calculated from the layer data (the forming data) based on the three-dimensional data used for forming the formed object 80.

At a timing at which a cutting point between portions of the forming material 90 that have been cut by the cutter 28 reaches the forming surface 14A, the controller 16 performs control so as to stop the supply from the delivering roller 24 and the delivering roller 26 and cause the first heating portion 34 to relatively separate from the forming surface 14A (the forming table 14) to cut the forming material 90 at the cutting point.

Moreover, at a timing at which the trailing end portion (the trailing end surface 90E) of the preceding forming material 90F reaches the cutter 28, the controller 16 stops the supply of the delivering roller 26 and control the supply of the delivering roller 24 so that the leading end portion (the leading end surface 90T) of the following forming material 90S reaches the cutter 28.

Accommodation Chamber

As FIG. 1 illustrates, reels 72 on which the respective forming materials 90 are wound are rotatably provided in an upper portion of the accommodation chamber 70. That is, four reels 72 are arranged in a line in the depth direction, and the forming materials 90 that have been unreeled from the respective reels 72 are supplied to the delivering roller 24 via a pulley 66 provided in the forming chamber 20 and via the above-described pulley 22.

Reels 74 for replacement on which the respective forming materials 90 are wound are provided in a lower portion of the accommodation chamber 70. Although, the number of the reels 74 for replacement is not particularly limited, as with the reels 72, plural reels 74 are arranged in a line in the depth direction. The forming material 90 unreeled from each of the reels 72 is the preceding forming material 90F, and the forming material 90 unreeled from each of the reels 74 is the following forming material 90S.

Formed Object

As FIG. 5 illustrates, the formed object 80 of the present exemplary embodiment has a shape in which, for example, a large-diameter portion 82 and a small-diameter portion 84 that have a bottomed cylindrical shape and have different outside diameters and different inside diameters are coupled by a plate-shaped coupling portion 86. The mass of the formed object 80 is 2.59 kg, and the width in the longitudinal direction is 0.68 m. Thus, regarding the forming materials 90 for manufacturing the formed object 80 in a case of simultaneously using four parallel forming materials 90, the mass per forming material 90 is 647.5 g (2.59 kg/4).

Here, the amount (length) of the forming material 90 that is wound on a single reel 72 is 1590 m, and the mass thereof is 500 g. Thus, when the formed object 80 that requires 647.5 g of the forming material 90 is manufactured, at least one reel 72 needs to be replaced by (added with) the reel 74 for replacement.

Regarding the forming-material connecting device 50 and the forming apparatus 10 having the above described configurations, the functions thereof will be described next.

As described above, when the formed object 80 is manufactured, the four reels 72 are not sufficient, and one more reel, that is, the reel 74 is required. Here, the joining portion 30 as the forming-material connecting device 50 is provided in the forming apparatus 10 according to the present exemplary embodiment. Thus, the forming material 90 is supplied in a connected manner without break.

Specifically, the delivering rollers 24 and 26 are stopped at the time when a trailing end portion (a trailing end surface 90E) of the forming material 90 supplied from, out of the four reels 72, the reel 72 in which the forming material 90 is to run out fastest reaches the position of the cutter 28. The reel 72 that has become empty fastest is then removed, the reel 74 for replacement is attached, a forming material 90 of the reel 74 is looped over the pulley 22, and the delivering roller 24 is driven until a leading end portion (a leading end surface 90T) of the forming material 90 reaches the position of the cutter 28.

Thus, the trailing end surface 90E in the trailing end portion of the preceding forming material 90F and the leading end surface 90T in the leading end portion of the following forming material 90S unreeled from the reel 74 are caused to face each other (refer to FIG. 4), and the forming material 90F and the forming material 90S that face each other are disposed in the joining portion 30. Such a disposition is controlled by the controller 16.

That is, the controller 16 stops the supply from the delivering rollers 24 and 26 at a timing at which the trailing end portion (the trailing end surface 90E) of the preceding forming material 90F reaches the cutter 28. The controller 16 then controls the supply from the delivering roller 24 so that the leading end portion (the leading end surface 90T) of the following forming material 90S reaches the cutter 28. In such a state, the delivering roller 24 and the delivering roller 26 rotate by a predetermined amount in a synchronized manner, and the trailing end surface 90E of the preceding forming material 90F and the leading end surface 90T of the following forming material 90S in a state of facing each other are thereby disposed between the paired nip members 32 that are in the open state.

Thereafter, the trailing end portion of the forming material 90F and the leading end portion of the following forming material 90S are pressed with the paired nip members 32 being in the closed state and heated to, for example, 270° C. by the heaters provided inside the respective nip members 32. Thus, the resin material 94 in the trailing end portion of the forming material 90F and the resin material 94 in the leading end portion of the forming material 90S are melted to be joined to each other. Note that, at this time, materials to be joined to each other are the resin materials 94, not the fiber bundles 92. That is, the fiber bundles 92 of the forming material 90F and the fiber bundles 92 of the forming material 90S are not joined to each other.

However, because the resin materials 94 are joined to each other, when the forming material 90 is supplied by the delivering roller 24 and the delivering roller 26 with the paired nip members 32 being in the open state and even if the forming material 90S that is connected to the forming material 90F is pulled by the delivering roller 26, the joined surfaces of the forming material 90F and the forming material 90S do not separate from each other. Thus, the forming material 90S is supplied in a connected manner, and a forming process thereby continues.

In such a way, according to the present exemplary embodiment, in the forming apparatus 10, the following forming material 90S that has replaced may be added smoothly to the preceding forming material 90F. Thus, layer forming efficiency during the forming process may be suppressed from decreasing, and a defective portion such as a parting line may be suppressed from occurring. The controller 16 is capable of performing control so that such a joint between the forming material 90F and the added forming material 90S is located in a portion of the formed object 80 that does not affect the strength of the formed object 80.

The following forming material 90S is supplied in a state of being joined to the preceding forming material 90F. Thus, compared with a configuration in which the following forming material 90S is supplied in a state of not being joined to the preceding forming material 90F, even if the following forming material 90S is softened at an exit of the tube member 35, a problem, for example, with the tube member 35 being clogged with the forming material 90S at the exit of the tube member 35 may be unlikely to occur.

At the time when the trailing end surface 90E of the forming material 90F and the leading end surface 90T of the forming material 90S are joined to each other, a resin material may be added from the supplementing portion 33. In such a way, compared with a case of joining by using only the resin material 94 of each forming material 90, the resin material 94 in the trailing end surface 90E of the forming material 90F and the resin material 94 in the leading end surface 90T of the forming material 90S may easily be joined to each other.

Regarding the forming apparatus 10, there is a case in which the delivering roller 26 is configured to rotate around the axis in the supply direction of the forming material 90. That is, there is a case in which the forming material 90 is supplied to the forming surface 14A in a twisted manner to form a curved object. In such a case, to form a formed object, there is a case in which, halfway through the forming process, the forming material 90 is supplied to the forming surface 14A in a regular state in which the forming material 90 is not twisted.

The present exemplary embodiment is applicable to such a case. That is, by using the cutter 28, the forming material 90 is cut at a boundary point between a twisted portion in a twisted state and a linear portion in a regular state of not being twisted. "To cut" here means to cut all of each of the fiber bundles 92. When the cutter 28 performs cutting, the rotation of the delivering roller 24 and the delivering roller 26 is stopped.

The delivering roller 24 and the delivering roller 26 are then caused to rotate in a synchronized manner, and portions of the forming material 90 that have been cut by the cutter 28 at a cutting point in the forming material 90 are disposed in the joining portion 30. That is, the portions of the forming material 90 are nipped (pressed) by the paired nip members 32 and heated to be joined to each other (at this time, a resin material may be added from the supplementing portion 33). Thus, a portion of the forming material 90 on the downstream side with respect to the cutting point is twisted (is the twisted portion of the forming material 90), and a portion of the forming material 90 on the upstream side with respect to the cutting point is regular and non-twisted (is the linear portion of the forming material 90).

In such a way, the present exemplary embodiment is applicable to a case in which the linear portion is required to be formed directly behind the twisted portion (the twisted portion and the linear portion are enabled to be supplied in a connected manner). The controller 16 controls the stop/start of the supply from the delivering roller 24 and the delivering roller 26 and the cutting operation of the cutter 28. Thus, portions of the forming material 90 may be joined to each other with better accuracy than in a case in which the cutting operation is performed by the cutter 28 without stopping the supply from the delivering roller 24 and the delivering roller 26.

Regarding the forming apparatus 10, after the N-th layer (N is a natural number) is formed, when the (N+1)th layer is formed, there is a case in which the forming material 90 is cut at the end of the N-th layer. Thus, a forming apparatus of the related art (not illustrated) includes a cutter (not illustrated) for such a purpose provided on the downstream side with respect to the first heating portion 34.

However, in such a case, because a position at which the cutter is to be provided is limited, a surplus portion of the forming material 90 is left; that is, a residue is formed at the end of the N-th layer. In a case in which the forming material 90 is not cut at the end of the N-th layer, a portion of the forming material 90 having a length equivalent to the length of each of the N layers needs to be prepared.

The present exemplary embodiment may address such a problem. First, the controller 16 detects a trailing end portion of the N-th layer from the layer data (the forming data) based on the three-dimensional data of the formed object 80. From the detection result, the controller 16 then calculates the remaining required amount (length) of the forming material 90 sufficient for completing up to the trailing end portion of the N-th layer and causes the cutter 28 to cut the forming material 90 so that a portion of the forming material 90 has a length equivalent to the calculated length.

In such a case, all of each of the fiber bundles 92 may be cut or only a portion of the fiber bundles 92 may be cut so that some fibers are not cut and are left. However, the number of fibers that are not cut and are left is approximately equivalent to the number of fibers that are easily cut following the movement in which the first heating portion 34 separates from the forming surface 14A.

Next, the portions of the forming materials 90 that have been cut (the portion of the forming material 90 on the downstream side with respect to the cutting point and the portion of the forming material 90 on the upstream side with respect to the cutting point) are sent to the joining portion 30, pressed and heated as described above, and joined to each other by melting the resin materials 94 thereof (at this time, a resin material may be added from the supplementing portion 33). After the portions of the forming material 90 are joined to each other, the heating operation and the pressing operation are stopped, the forming material 90 is supplied to the forming surface 14A by using delivering rollers 24 and 26, and the N-th layer is formed.

When the N-th layer has been completed, the cutting point of the forming material 90 is positioned at the end of the N-th layer. Thus, when the driving of the delivering rollers 24 and 26 is stopped at such a timing and if the first heating portion 34 is separated from the forming surface 14A (the forming table 14), the forming material 90 is easily broken (cut) at the cutting point by simply being pulled because the portions of the forming material 90 are joined to each other by only the resin material 94 (or only the resin material 94 and some fibers).

In such a way, the forming material 90 is cut in advance and supplied (in a state in which portions of the forming material 90 that have been cut are joined to each other by only the resin material 94) so that a portion of the forming material 90 in an amount sufficient for completing only the N-th layer is supplied. Thus, the problem that, when the forming material 90 is broken (cut) at the end of the forming process of the N-th layer, a residue of the forming material 90 is formed and left may be addressed.

In other words, a surplus portion of the forming material 90 may be suppressed or prevented from being generated compared with a case in which the controller 16 causes the first heating portion 34 to relatively separate from the forming table 14 regardless of the timing at which the cutting point between the portions of the forming material 90 reaches the forming surface 14A of the forming table 14.

Because the forming material 90 is easily broken (cut) at the cutting point by the first heating portion 34 simply separating from the forming surface 14A of the forming table 14, a cutter for cutting the forming material 90 is not necessarily provided on the downstream side with respect to the first heating portion 34. Thus, a defect in shape of a cut surface that is generated when the forming material 90 is cut by the cutter may be suppressed or prevented from occurring.

The forming-material connecting device 50 and the forming apparatus 10 according to the present exemplary embodiment are described above with reference to the drawings. However, the forming-material connecting device 50 and the forming apparatus 10 according to the present exemplary embodiment are not limited to the illustrated configurations, and modification in design can be made as appropriate without departing from the scope and spirit of the present disclosure.

For example, a forming material 90 that is unreeled from one reel 72 out of the four reels 72 may be cut by the cutter 28 at a midpoint of the forming material 90, the one reel 72 may be replaced by a reel 74 for replacement, a forming material 90 may be unreeled from the reel 74, and the forming material 90 (90S) unreeled from the reel 74 may be joined to the preceding forming material 90 (90F) unreeled from the reel 72.

Such a configuration is applicable to a case in which a forming material 90 having different number of the fiber bundles 92 is used for forming an formed object in a middle of the forming process (for example, the number of the fiber bundles 92 changes from 3000 to 5000) or a case in which a material of the forming material 90 is changed to another material (for example, a forming material containing a fiber bundle that is not made of carbon fibers, or a forming material containing a resin material that is not a polyamide synthetic resin).

In addition, as the imaginary line in FIG. 1 illustrates, the joining portion 30 (including the cutter 28 and the supplementing portion 33) may be disposed on the downstream side with respect to the pulley 66 and on the upstream side with respect to the pulley 22. That is, the joining portion 30 (including the cutter 28 and the supplementing portion 33) may be disposed on the upstream side with respect to the delivering roller 24.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A forming-material connecting device comprising:
    a cutter that cuts a forming material constituted by a plurality of continuous fiber bundles and supplied in a supply direction corresponding to an extending direction of the plurality of continuous fiber bundles, the cutter cutting at least a portion of the plurality of continuous fiber bundles, the plurality of continuous fiber bundles being impregnated with a resin material; and
    a joining portion that joins two cut portions of the forming material by joining the resin materials of the two cut portions by heating, the two cut portions being obtained by cutting the forming material at a cutting point in the forming material, one of the two cut portions being upstream of the cutting point in the supply direction, another of the two cut portions being downstream of the cutting point in the supply direction, or joins a trailing end portion of a preceding forming material and a leading end portion of a following forming material by joining the resin materials of the preceding forming material and the following forming material by heating.

2. The forming-material connecting device according to claim 1, further comprising:
    a supplementing portion that adds a resin material, which is used for joining the resin materials, between the two cut portions of the forming material or between the trailing end portion of the preceding forming material and the leading end portion of the following forming material.

3. The forming-material connecting device according to claim 1,
    wherein the cutter cuts through all of the plurality of continuous fiber bundles.

4. The forming-material connecting device according to claim 2,
    wherein the cutter cuts through all of the plurality of continuous fiber bundles.

5. A forming apparatus equipped with a placement table, comprising:
    a first supply portion that supplies a forming material constituted by a plurality of continuous fiber bundles being impregnated with a resin material in a supply direction corresponding to an extending direction of the plurality of continuous fiber bundles;
    a second supply portion that is disposed on a downstream side with respect to the first supply portion in the supply direction and supplies the forming material;
    a heating portion that heats the forming material supplied by the second supply portion and supplies the forming material to the placement table;
    a pressing portion that presses the forming material supplied to the placement table; and
    the forming-material connecting device according to claim 1, the forming-material connecting device being disposed between the first supply portion and the second supply portion or on an upstream side with respect to the first supply portion in the supply direction.

6. The forming apparatus according to claim 5, further comprising:
    a controller that controls stop/start of supply from the first supply portion and the second supply portion and a cutting operation of the cutter so that the forming material is cut at a timing calculated from forming data used for forming a formed object.

7. The forming apparatus according to claim 6,
    wherein the heating portion is configured to approach and separate from the placement table under control of the controller, and
    wherein, at a timing at which the cutting point between the two cut portions of the forming material reaches the placement table, the controller stops the supply from the first supply portion and the second supply portion and causes the heating portion to separate from the placement table so that the forming material is cut at the cutting point.

8. The forming apparatus according to claim 6,
wherein, at a timing at which the trailing end portion of the preceding forming material reaches the cutter,
the controller stops the supply from the second supply portion and controls the supply from the first supply portion so that the leading end portion of the following forming material reaches the cutter.

9. The forming apparatus according to claim 7,
wherein, at a timing at which the trailing end portion of the preceding forming material reaches the cutter,
the controller stops the supply from the second supply portion and controls the supply from the first supply portion so that the leading end portion of the following forming material reaches the cutter.

\* \* \* \* \*